(No Model.)
E. O. LONG.
COMBINED PLOW AND HARROW.
No. 298,486. Patented May 13, 1884.
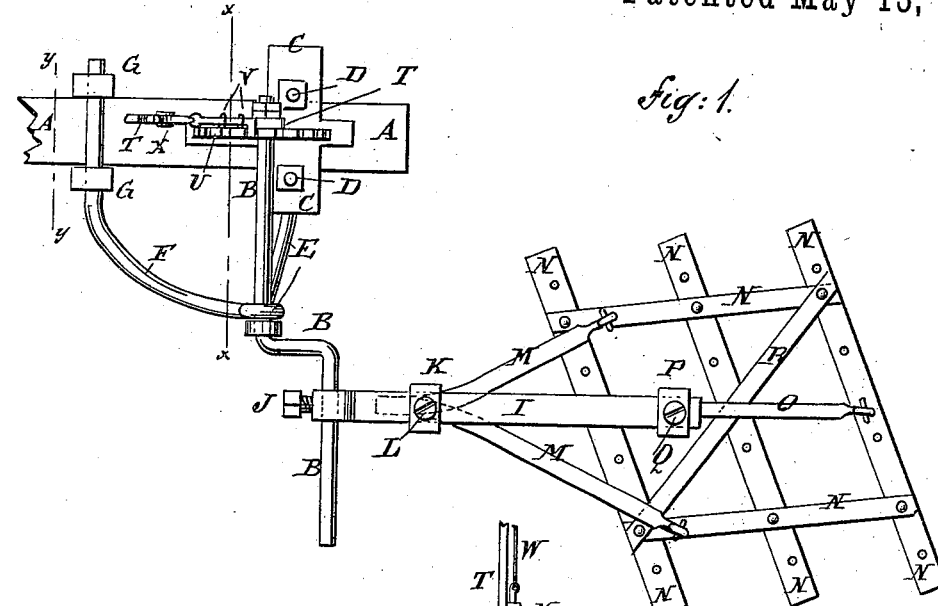
Fig. 1.
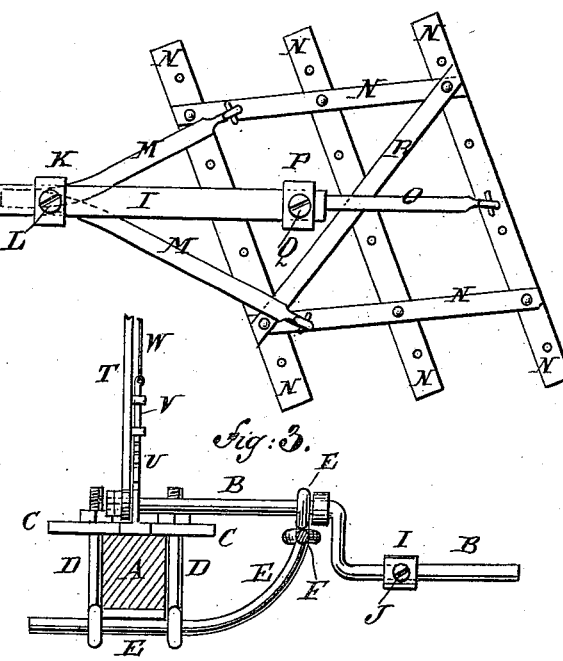
Fig. 2. Fig. 3.
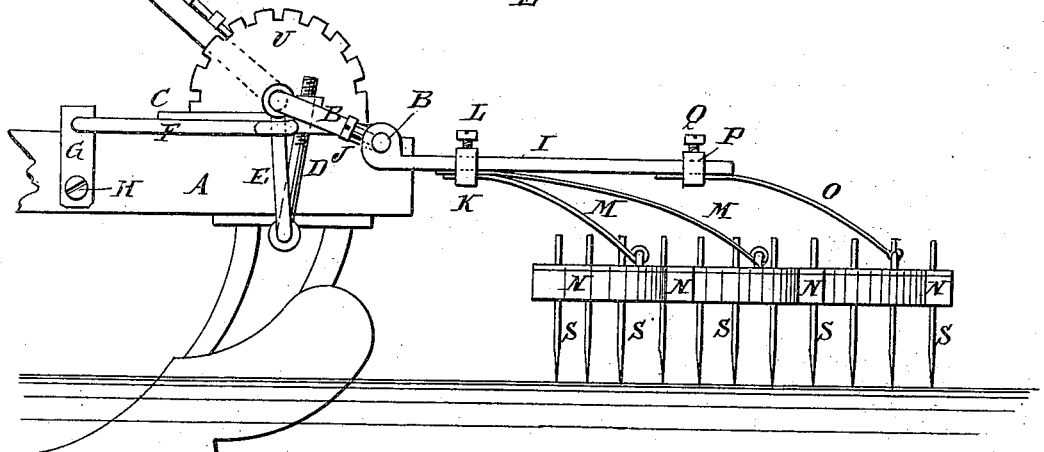
Fig. 4.
WITNESSES:
Chas. Nida.
C. Sedgwick.
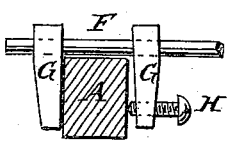
INVENTOR:
E. O. Long
BY Munn & Co
ATTORNEYS.

UNITED STATES PATENT OFFICE.

ELLIS O. LONG, OF HAYESVILLE, OHIO.

COMBINED PLOW AND HARROW.

SPECIFICATION forming part of Letters Patent No. 298,486, dated May 13, 1884.

Application filed November 13, 1883. (No model.)

*To all whom it may concern:*

Be it known that I, ELLIS O. LONG, of Hayesville, in the county of Ashland and State of Ohio, have invented a new and useful Improvement in a Combined Plow and Harrow, of which the following is a full, clear, and exact description.

Reference is to be had to the accompanying drawings, forming a part of this specification, in which similar letters of reference indicate corresponding parts in all the figures.

Figure 1 is a plan view of my improvement. Fig. 2 is a side elevation of the same. Fig. 3 is a sectional front elevation of the same, taken through the line *x x*, Fig. 1, the harrow being omitted. Fig. 4 is a sectional front elevation of a part of the same, taken through the line *y y*, Fig. 1.

The object of this invention is to facilitate the preparation of soil to receive seed.

The invention consists in a plow-beam and harrow connected by a crank-rod, a connecting-bar, and a set of springs. The crank-rod is secured to the plow-beam and held against the draft-strain of the harrow by braces and clamps, and the springs and connecting-rod are adjustably connected by bands and set-screws, so that the harrow may be readily adjusted, as hereinafter set forth.

A represents a plow-beam.

B is a rod, the inner end of which works in bearings formed upon or attached to the plate C, secured to the plow-beam A by the eyebolts D and the brace E, which passes through the eyes of the eyebolts D at the lower side of the plow-beam A. The plate C, eyebolts D, and brace E form a clamp for securing the rod B to the plow-beam A. The outer part of the brace E is curved upward, and has an eye in its end, through which the middle part of the rod B passes.

F is a second brace, which has an eye in its outer end to receive the middle part of the rod B or the upper part of the brace E, as may be desired. The brace F is curved inward, crosses the upper side of the beam A, and has two arms, G, attached to it, which project downward at the opposite sides of the said plow-beam, and one or both of which are provided with a set-screw, H, for clamping the said brace securely in place. The outer part of the rod B is bent into crank form, as shown in Figs. 1, 2, and 3, and passes through an eye formed in the forward end of the bar I, which is secured in place upon the said rod adjustably by a set-screw, J.

To the bar I, at a little distance from the rod B, is secured, by a band, K, and set-screw L, the forward end of two springs, M, the rear ends of which are hinged or otherwise secured to the forward part of the harrow-frame N, near its ends.

To the center of the rear part of the harrow-frame N is hinged or otherwise secured the rear end of a third spring, O, the forward end of which is secured to the rear part of the bar I by a band, P, and set-screw Q. The harrow-frame N is strengthened by one or more braces, R, and is provided with teeth S in the ordinary manner. With this construction the crank-rod B can be readily secured to or detached from the plow-beam, and the harrow can be adjusted nearer to or farther from the plow-beam, as the width of the furrow-slice may require. With this construction, also, the springs M M O hold the harrow down to its work and allow it to rise should the teeth S strike a stump, stone, or other obstruction. The clamps K L and P Q allow the springs M M O to be readily adjusted, and the crank shape of the rod B allows the said rod to be adjusted to a plow-beam of high, low, or medium height by turning the said crank downward, upward, or into a horizontal position. The inner end of the rod B is made eight-square, and to it is fitted the end of a lever, T, which is secured in place upon the said rod by a nut, so that the said lever can be readily detached and adjusted as the adjustment of the crank-rod B may require. The lever T moves along the side of a catch-plate, U, attached to the clamp-plate C, and provided with notches in its curved upper edge, with which engages a pawl, V, sliding in keepers attached to the lever T, and connected by a rod, W, with an elbow-lever, X, pivoted at an angle to the upper part of the said lever T, and pressed outward to hold the pawl V in gear with the catch-plate U by a spring, Y, attached to one of the levers T X.

If desired, the catch-teeth may be formed in a laterally-projecting flange formed upon the edge of the plate U, and the lever T made elastic, and provided with a single tooth to engage with the said catch-teeth. With this construction, by operating the lever T, the harrow can be raised from the ground to pass obstructions and when turning around at the end of a furrow.

Having thus described my invention, I claim as new and desire to secure by Letters Patent—

1. The combination, with the plow-beam A and the harrow N S, of the crank-rod B, the connecting-bar I, and the springs M O, substantially as herein shown and described, whereby the said harrow is adjustably connected with the said plow-beam, as set forth.

2. The combination, with the plow-beam A and the crank-rod B, of the braces E F and the clamps C D and G H, substantially as herein shown and described, whereby the said crank-rod is securely connected with the said plow-beam and firmly supported against the draft-strain of the harrow, as set forth.

3. The combination, with the crank-rod B and the harrow N S, of the connecting-bar I, the springs M O, and the bands and set-screws K L and P Q, substantially as herein shown and described, whereby the said harrow is adjustably connected with the said crank-rod, as set forth.

ELLIS O. LONG.

Witnesses:
CH. SPIESS,
A. BUTCHER.